United States Patent
Shiozaki et al.

(10) Patent No.: US 9,478,830 B2
(45) Date of Patent: *Oct. 25, 2016

(54) NON-AQUEOUS ELECTROLYTE SECONDARY BATTERY COMPRISING PHOSPHORIC ACID ESTER COMPOUND CONTAINING AT LEAST ONE METAL ELEMENT

(71) Applicant: Panasonic Corporation, Osaka (JP)

(72) Inventors: Tomoki Shiozaki, Osaka (JP); Yasunari Sugita, Osaka (JP); Kazuki Endo, Osaka (JP); Miyuki Nakai, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 161 days.

This patent is subject to a terminal disclaimer.

(21) Appl. No.: 14/476,736

(22) Filed: Sep. 4, 2014

(65) Prior Publication Data

US 2015/0093638 A1    Apr. 2, 2015

(30) Foreign Application Priority Data

Sep. 30, 2013  (JP) ................. 2013-202928
Mar. 7, 2014   (JP) ................. 2014-044809
Jul. 22, 2014  (JP) ................. 2014-148990

(51) Int. Cl.
| | |
|---|---|
| *H01M 2/16* | (2006.01) |
| *H01M 4/62* | (2006.01) |
| *H01M 10/42* | (2006.01) |
| *H01M 10/052* | (2010.01) |

(52) U.S. Cl.
CPC ....... *H01M 10/4235* (2013.01); *H01M 2/1653* (2013.01); *H01M 4/628* (2013.01); *H01M 10/052* (2013.01); *Y02E 60/122* (2013.01)

(58) Field of Classification Search
CPC ................... H01M 10/4235; H01M 10/0568; H01M 10/05; H01M 6/16; H01M 4/628; H01M 2/1653
See application file for complete search history.

(56) References Cited

U.S. PATENT DOCUMENTS

| | | | | |
|---|---|---|---|---|
| 6,162,563 A | * | 12/2000 | Miura ............... | C08G 65/22 429/309 |
| 2003/0124432 A1 | * | 7/2003 | Miura ............... | C08G 65/02 429/317 |
| 2003/0235759 A1 | * | 12/2003 | Honbo ............... | H01M 4/56 429/225 |

(Continued)

FOREIGN PATENT DOCUMENTS

| | | | | |
|---|---|---|---|---|
| JP | 3131905 B2 | 2/2001 | | |
| WO | WO-2005/080490 A1 | * | 9/2005 | ............... C08L 5/08 |

*Primary Examiner* — Kenneth Douyette
(74) *Attorney, Agent, or Firm* — McDermott Will & Emery LLP (57) ABSTRACT

A non-aqueous electrolyte secondary battery includes an electrode assembly including a positive electrode including a positive electrode active material layer, a negative electrode, and a separator disposed between the positive electrode and the negative electrode; and a non-aqueous electrolyte, wherein at least one of the positive electrode and the separator contains a phosphoric acid ester compound containing at least one metal element and represented by a general formula (1)

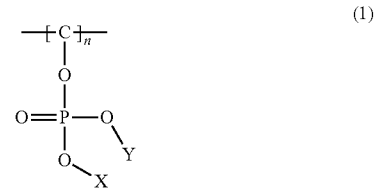

(1)

(where X and Y each represent a metal element, a hydrogen atom, or an organic group; at least one of X and Y represents a metal element; when the metal element is divalent, X and Y together represent a single metal element; and n represents an integer of 2 or more and 10 or less).

10 Claims, 5 Drawing Sheets

(56) References Cited

U.S. PATENT DOCUMENTS

| | | | | |
|---|---|---|---|---|
| 2004/0241546 A1* | 12/2004 | Hatta | ............... | H01M 4/136 429/231.1 |
| 2006/0210884 A1* | 9/2006 | Kawaguchi | ......... | H01M 2/1653 429/329 |
| 2007/0099089 A1* | 5/2007 | Miura | ............... | C08G 65/14 429/307 |

* cited by examiner

NON-AQUEOUS ELECTROLYTE SECONDARY BATTERY COMPRISING PHOSPHORIC ACID ESTER COMPOUND CONTAINING AT LEAST ONE METAL ELEMENT

BACKGROUND

1. Field

The present disclosure relates to a non-aqueous electrolyte secondary battery, in particular, to a lithium ion battery.

2. Description of the Related Art

It is known that, in non-aqueous electrolyte secondary batteries, phosphorus-containing compounds are used as a flame retardant for suppressing an exothermic reaction between a positive electrode active material and an electrolytic solution that is a non-aqueous electrolyte in liquid form. Japanese Patent No. 3131905 discloses that a phosphoric acid ester is dissolved at 15% by mass or more relative to the total mass of an electrolytic solution to thereby suppress an exothermic reaction between a positive electrode active material and the electrolytic solution.

SUMMARY

However, when such a technique disclosed in Japanese Patent No. 3131905 is employed, a large amount of a phosphoric acid ester is dissolved in an electrolytic solution, so that the ionic conductivity of the electrolytic solution is decreased or a reduction reaction of the phosphoric acid ester that is a side reaction occurs on the surface of the negative electrode. Thus, the charge-discharge efficiency is decreased.

An embodiment of the present disclosure provides a non-aqueous electrolyte secondary battery that is excellent in terms of battery performance, in particular, flame retardancy and charge-discharge efficiency.

A non-aqueous electrolyte secondary battery according to an embodiment of the present disclosure includes an electrode assembly having a positive electrode including a positive electrode active material layer, a negative electrode, and a separator disposed between the positive electrode and the negative electrode; and a non-aqueous electrolyte, wherein at least one of the positive electrode and the separator contains a phosphoric acid ester compound containing at least one metal element and represented by a general formula (1)

(1)

(where X and Y each represent a metal element, a hydrogen atom, or an organic group; at least one of X and Y represents a metal element; when the metal element is divalent, X and Y together represent a single metal element; and n represents an integer of 2 or more and 10 or less).

In a non-aqueous electrolyte secondary battery according to an embodiment of the present disclosure, exothermic reactions are suppressed and the battery is excellent in terms of battery performance, in particular, flame retardancy and charge-discharge efficiency.

DESCRIPTION OF EMBODIMENTS

First Embodiment

Hereinafter, a first embodiment according to the present disclosure will be described in detail. A non-aqueous electrolyte secondary battery according to this embodiment of the present disclosure has, for example, the following configuration: a case contains a non-aqueous electrolyte and an electrode assembly in which a positive electrode and a negative electrode are wound or stacked with a separator therebetween. Hereafter, components of the non-aqueous electrolyte secondary battery will be described in detail.

Positive Electrode

Figure 1:
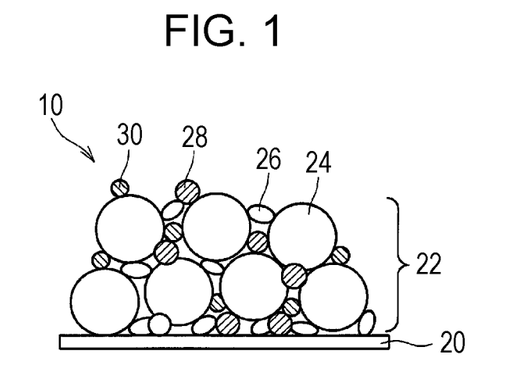
FIG. 1 is a fragmentary sectional view of a positive electrode for a non-aqueous electrolyte secondary battery according to a first embodiment of the present disclosure.

FIG. 1 is a fragmentary sectional view of a positive electrode 10. The positive electrode 10 includes a positive electrode current collector 20 formed of a metal foil or the like and a positive electrode active material layer 22 formed on the positive electrode current collector 20. The positive electrode current collector 20 is, for example, a foil of a metal that is stable in a potential range of the positive electrode or a film having a surface layer formed of a metal that is stable in a potential range of the positive electrode. Such a metal that is stable in a potential range of the positive electrode is, for example, aluminum. The positive electrode active material layer 22 contains, in addition to a positive electrode active material 24, a conductive agent 26, a binder 28, a phosphoric acid ester compound 30, and the like. These substances are mixed in an appropriate solvent, applied to the positive electrode current collector 20, then dried, and rolled, so that the positive electrode active material layer 22 is formed.

The positive electrode active material 24 may be a transition metal oxide containing an alkali metal element or such a transition metal oxide in which a transition metal element is partially replaced by a different element. Examples of the alkali metal element include lithium (Li) and sodium (Na). Of these alkali metal elements, for example, lithium is used. The transition metal element may be at least one selected from the group consisting of scandium (Sc), manganese (Mn), iron (Fe), cobalt (Co), nickel (Ni), copper (Cu), and yttrium (Y), for example. Of these transition metal elements, for example, Mn, Co, and Ni are used. The different element may be, for example, at least one selected from the group consisting of magnesium (Mg), aluminum (Al), lead (Pb), antimony (Sb), and boron (B). Of these different elements, for example, Mg and Al are used.

Specific examples of the positive electrode active material 24 include lithium-containing transition metal oxides containing lithium as the alkali metal element, such as $LiCoO_2$, $LiNiO_2$, $LiMn_2O_4$, $LiMnO_2$, $LiNi_{1-y}Co_yO_2$ (0<y<1), $LiNi_{1-y-z}Co_yMn_zO_2$ (0<y+z<1), and $LiFePO_4$. Regarding the positive electrode active material 24, such materials may be used alone or in combination of two or more thereof.

The conductive agent 26 is used to enhance the electronic conductive property of the positive electrode active material layer 22. Examples of the conductive agent 26 include conductive carbon materials, metal powders, metal oxides, and organic materials. Specifically, examples of the carbon materials include acetylene black, Ketjenblack, and graphite; examples of the metal powders include aluminum powder; examples of the metal oxides include potassium titanate and titanium oxide; and examples of the organic materials include phenylene derivatives. Regarding the conductive agent 26, such materials may be used alone or in combination of two or more thereof.

The binder 28 is used to keep particles of the positive electrode active material 24 in good contact with each other, to keep the positive electrode active material 24 and the conductive agent 26 in good contact with each other, and to enhance the binding property of the positive electrode active material 24 and the like to the surface of the positive electrode current collector 20. Examples of the binder 28 include fluorine based polymers and rubber based polymers. Specifically, examples of the fluorine based polymers include polytetrafluoroethylene (PTFE), polyvinylidene fluoride (PVdF), and modified substances of the foregoing; and examples of the rubber based polymers include ethylene-propylene-isoprene copolymers and ethylene-propylene-butadiene copolymers. The binder 28 may be used in combination with a thickener such as carboxymethyl cellulose (CMC) or polyethylene oxide (PEO).

The phosphoric acid ester compound 30 is a flame-retardant powder and has a function of a flame retardant that is a reaction inhibitor hindering initiation of an exothermic reaction between the electrolytic solution and the positive electrode active material 24 and suppressing the amount of heat generated. The phosphoric acid ester compound 30 is, for example, a phosphoric acid ester compound containing at least one metal element and represented by a general formula (1)

(1)

(where X and Y each represent a metal element, a hydrogen atom, or an organic group; at least one of X and Y represents a metal element; when the metal element is divalent, X and Y together represent a single metal element; and n represents an integer of 2 or more and 10 or less).

The phosphoric acid ester compound 30 represented by the general formula (1) may have a hydrogen atom or an organic group. This organic group denotes a group containing at least one carbon atom. The organic group is, for example, an organic group having a carbon-hydrogen bond. In the case where the organic group has two or more carbon atoms, it may be selected from saturated organic groups whose carbon-carbon bonds are each constituted by a single bond or unsaturated organic groups whose carbon-carbon bonds include at least one of a double bond and a triple bond. The organic group may contain a hetero atom such as an oxygen atom, a nitrogen atom, or a sulfur atom. Examples of the organic group include $C_{1-10}$ alkyl groups, aralkyl groups, alkoxy groups, cycloalkyl groups, and aryl groups. The organic group is not particularly limited, but is, for example, a monovalent or divalent organic group.

The phosphoric acid ester compound 30 represented by the general formula (1) has at least one metal element. Such a metal element may be a main group metal element or a transition metal element. The metal element is not particularly limited as long as it does not adversely affect battery performance. In particular, a monovalent or divalent metal element is preferred. Examples of the metal element include Ca, Mg, Na, K, and Zn. From the viewpoint of, for example, solubility in an electrolytic solution and thermal stability, Ca and Mg are preferred.

In general, the higher the phosphorus content of the phosphoric acid ester compound 30, the better the flame retardancy probably becomes. Accordingly, in the general formula (1), n, which is defined above as representing 2 or more and 10 or less, may be 11 or more in some cases.

When the phosphoric acid ester compound 30 has a cyclic structure, compared with the case of having a chain structure, it probably tends not to solvate and becomes difficult to dissolve in the electrolytic solution. Accordingly, the phosphoric acid ester compound 30 is, for example, a metal salt of inositol-1,2,3,4,5,6-hexaphosphate having at least one metal element and represented by a general formula (2); and, from the viewpoint of structural stability, the phosphoric acid ester compound 30 is more, for example, a metal salt of myo-inositol-1,2,3,4,5,6-hexaphosphate having at least one metal element and represented by a general formula (3), (2)

(where $X_1$ to $X_6$ and $Y_1$ to $Y_6$ each represent a metal element, a hydrogen atom, or an organic group; at least one of $X_1$ to $X_6$ and $Y_1$ to $Y_6$ represents a metal element; when the metal element is divalent, $X_m$ and $Y_m$ together represent a single metal element where m represents an integer of 1 to 6)

(3)

(where $X_1$ to $X_6$ and $Y_1$ to $Y_6$ each represent a metal element, a hydrogen atom, or an organic group; at least one of $X_1$ to $X_6$ and $Y_1$ to $Y_6$ represents a metal element; when the metal element is divalent, $X_m$ and $Y_m$ together represent a single metal element where in represents an integer of 1 to 6).

The phosphoric acid ester compound 30 represented by any one of the general formulae (1) to (3) contains at least one metal element. From the viewpoint of, for example, solubility in an electrolytic solution and thermal stability, the phosphoric acid ester compound 30 is, for example, a metal salt of myo-inositol hexaphosphate containing Ca and Mg as such metal elements and represented by a compositional formula of $C_6H_6Ca_mMg_{6-m}O_{24}P_6$ where m satisfies $0 \leq m \leq 6$. An example of this metal salt is a calcium-magnesium double salt of myo-inositol hexaphosphate represented by a chemical formula. (4) (average compositional formula: $C_6H_6Ca_5Mg_1O_{24}P_6$, molecular weight: 872.6).

(4)

During charging, oxygen generated from the positive electrode active material 24 probably oxidizes the electrolytic solution. This oxidation reaction is an exothermic reaction with heat generation and hence increases the inside temperature of the battery. In order to suppress the exothermic reaction between the positive electrode active material 24 and the electrolytic solution, since oxygen is generated from the positive electrode active material 24, it is effective to dispose a flame retardant so as to be close to the positive electrode active material 24.

Accordingly, the inventors of the present disclosure considered that, by making the phosphoric acid ester compound 30 be present within the positive electrode 10, the exothermic reaction between oxygen and the electrolytic solution is suppressed. Thus, the phosphoric acid ester compound 30 is, for example, added together with the positive electrode active material 24 during formation of the positive electrode active material layer 22. In some cases, with consideration of, for example, the energy density of the positive electrode 10, the phosphoric acid ester compound 30 may be applied to a surface of the separator, the surface facing the positive electrode 10.

The phosphoric acid ester compound 30 is, for example, difficult to dissolve in the electrolytic solution so that it remains within the positive electrode active material layer 22. As an index of the degree of difficulty with which the phosphoric acid ester compound 30 dissolves in the electrolytic solution, the solubility of the phosphoric acid ester compound 30 in the electrolytic solution was used.

The solubility was measured in the following manner. A non-aqueous solvent was prepared that contained ethylene carbonate (EC), ethyl methyl carbonate (EMC), and dimethyl carbonate (DMC) mixed in a volume ratio of 3:3:4. This solvent mixture was used as the electrolytic solution. To 10 g of this electrolytic solution weighed, 1 g of the phosphoric acid ester compound 30 was added and sufficiently stirred at 25° C. Subsequently, the electrolytic solution was removed by filtration and the mass of the resultant undissolved portion was measured. Thus, the mass of the phosphoric acid ester compound 30 dissolved in the electrolytic solution was determined. The solubility (%) of the phosphoric acid ester compound 30 relative to the electrolytic solution was determined by the following calculation: the mass (g) of the phosphoric acid ester compound 30 dissolved in the electrolytic solution at an ambient temperature of 25° C. was divided by the mass (g) of the electrolytic solution and the result was multiplied by 100.

The solubility relative to the electrolytic solution is, for example, 0.1% or less. The lower limit of the solubility is not particularly limited. The solubility is, for example, 0%, that is, the phosphoric acid ester compound 30 is insoluble.

Accordingly, addition of a small amount of the phosphoric acid ester compound 30 will suffice, compared with the case of using a flame retardant soluble in the electrolytic solution. The optimal amount of the phosphoric acid ester compound 30 added can be calculated on the basis of the volumetric energy density of the positive electrode. The ratio of this amount relative to the total mass of the positive electrode active material layer 22 is, for example, 0.1% by mass or more and 5% by mass or less, more, for example, 0.1% by mass or more and 3% by mass or less. When the ratio is more than 5% by mass, the positive electrode active material layer 22 may have a low energy density. When the ratio is less than 0.14% by mass, there are cases where the effect of the flame retardant is not sufficiently provided.

Negative Electrode

The negative electrode is not particularly limited and may be selected from negative electrodes that have been used to date as negative electrodes for non-aqueous electrolyte secondary batteries. For example, such a negative electrode can be obtained by mixing a negative electrode active material and a binder in water or an appropriate solvent, by applying the resultant mixture to a negative electrode current collector, and by performing drying and rolling.

The negative electrode active material is not particularly limited as long as it is a material into which alkali metal ions can be inserted and from which alkali metal ions can be extracted. Examples of the negative electrode active material include carbon materials, metals, alloys, metal oxides, metal nitrides, and carbon and silicon into which alkali metal has been inserted. Examples of the carbon materials include natural graphite, artificial graphite, and pitch-based carbon fiber. Specific examples of the metals and alloys include lithium (Li), silicon (Si), tin (Sn), germanium (Ge), indium (In), gallium (Ga), lithium alloys, silicon alloys, and tin alloys. Regarding the negative electrode active material, such materials may be used alone or in combination of two or more thereof.

As in the positive electrode 10, the binder can be selected from fluorine based polymers, rubber based polymers, and the like. The binder is, for example, a styrene-butadiene copolymer (SBR), which is a rubber based polymer, or a modified substance of SBR. The binder may be used in combination with a thickener such as carboxymethyl cellulose (CMC).

The negative electrode current collector is, for example, a foil of a metal that does not form alloy with lithium in a potential range of the negative electrode, or a film having a surface layer formed of a metal that does not form alloy with lithium in a potential range of the negative electrode. Such a metal that does not form alloy with lithium in a potential range of the negative electrode is, for example, copper, which is inexpensive, easily processed, and has a good electronic conductive property.

Non-Aqueous Electrolyte

The non-aqueous electrolyte contains a non-aqueous solvent and an electrolyte salt dissolved in the non-aqueous solvent. Although an electrolytic solution will be described below as the non-aqueous electrolyte, the non-aqueous electrolyte may be a solid electrolyte.

Examples of the non-aqueous solvent include cyclic carbonates, chain carbonates, nitriles, and amides. Examples of the cyclic carbonates include cyclic ester carbonates, cyclic carboxylic acid esters, and cyclic ethers. Examples of the chain carbonates include chain esters and chain ethers. Specific examples include cyclic ester carbonates such as ethylene carbonate (EC), fluoroethylene carbonate (FEC), propylene carbonate, and butylene carbonate; cyclic carboxylic acid esters such as γ-butyrolactone (GBL), methyl acetate, ethyl acetate, propyl acetate, methyl propionate, and ethyl propionate; chain esters such as ethyl methyl carbonate (EMC), dimethyl carbonate (DMC), diethyl carbonate, methyl propyl carbonate, ethyl propyl carbonate, and methyl isopropyl carbonate; nitriles such as acetonitrile; and amides such as dimethylformamide.

Examples of the cyclic ethers include 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ether. Examples of the chain ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the non-aqueous solvent also include halogen substituted compounds in which hydrogen atoms of such non-aqueous solvents are replaced by halogen atoms such as fluorine atoms. In particular, preferred is a mixture of EC, which is a cyclic ester carbonate that is a high dielectric solvent, and EMC and DMC, which are chain ester carbonates that are low viscosity solvents.

As described above, the non-aqueous solvent may contain FEC. The content of FEC relative to the total mass of the non-aqueous solvent is, for example, 0.1% by mass or more and 10% by mass or less, for example, 0.5% by mass or more and 7% by mass or less, for example, 1% by mass or more and 6% by mass or less. When the FEC content is within such a range, good cycle characteristics can be provided. That is, the non-aqueous solvent, for example, contains, in addition to FEC, at least one selected from other fluorine based solvents and non-fluorine based solvents. The non-aqueous electrolyte is not limited to a liquid electrolyte (non-aqueous electrolytic solution) and may be a solid electrolyte using a gelled polymer or the like.

Examples of FEC include 4-fluoroethylene carbonate (monofluoroethylene carbonate), 4,5-difluoroethylene carbonate, 4,4-difluoroethylene carbonate, 4,4,5-trifluoroethylene carbonate, and 4,4,5,5-tetrafluoroethylene carbonate. Of these, in particular, 4-fluoroethylene carbonate is preferred.

A example of the non-aqueous solvent is a combination of FEC and non-fluorine based solvents including ethylene carbonate (EC), ethyl methyl carbonate (EMC), and dimethyl carbonate (DMC). In this case, the EC content relative to the total mass of the non-aqueous solvent is, for example, 10% to 40% by mass, for example, 15% to 35% by mass. The EMC content relative to the total mass of the non-aqueous solvent is, for example, 15% to 45% by mass, for example, 20% to 40% by mass. The DMC content relative to the total mass of the non-aqueous solvent is, for example, 20 to 50% by mass, for example, 25% to 45% by mass.

The electrolyte salt may be an alkali metal salt and is, for example, a lithium salt. The lithium salt can be selected from supporting salts that have been commonly used for non-aqueous electrolyte secondary batteries. Examples of the lithium salt include $LiPF_6$, $LiBF_4$, $LiAsF_6$, $LiClO_4$, $LiCF_3SO_3$, $LiN(FSO_2)$, $LiN(C_lF_{2l+1}SO_2)(C_mF_{2m+1}SO_2)$ (l and m represent an integer of 1 or more), $LiC(C_pF_{2p+1}SO_2)(C_qF_{2q+1}SO_2)(C_rF_{2r+1}SO_2)$ (p, q, and r represent an integer of 1 or more), $Li[B(C_2O_4)_2]$ (lithium bis(oxalato)borate (LiBOB)), $Li[B(C_2O_4)F_2]$, $Li[P(C_2O_4)F_4]$, and $Li[P(C_2O_4)_2F_2]$. These lithium salts may be used alone or in combination of two or more thereof.

The electrolytic solution may contain an additive that is used for the purpose of, for example, forming a good film on the positive or negative electrode. Examples of the additive include vinylene carbonate (VC), ethylene sulfite (ES), cyclohexylbenzene (CHB), and modified substances of the foregoing. These additives may be used alone or in combination of two or more thereof. The mass ratio of the additive to the total mass of the electrolytic solution is not particularly limited and is, for example, about 0.05% to about 10% by mass.

Separator

The separator is a porous film having ion permeability and an insulating property and disposed between the positive electrode and the negative electrode. Examples of the porous film include a microporous film, woven fabric, and nonwoven fabric. The material of the separator is, for example, a polyolefin, for example, polyethylene or polypropylene.

EXAMPLES

Hereinafter, the present disclosure will be specifically described in detail with reference to Examples and Comparative examples. However, the present disclosure is not limited to these Examples below. In order to evaluate the effects of flame retardants, non-aqueous electrolyte secondary batteries used in Examples 1 and 2 and Comparative examples 1 and 2 were produced below. Specifically, the non-aqueous electrolyte secondary batteries were produced in the following manner.

Example 1

Production of Positive Electrode

Regarding a positive electrode active material, a lithium-containing transition metal oxide represented by a compositional formula of $LiNi_{0.5}Co_{0.2}Mn_{0.3}O_2$ was used. A positive electrode was produced in the following manner. The positive electrode active material 24 represented by the compositional formula of $LiNi_{0.5}Co_{0.2}Mn_{0.3}O_2$, acetylene black serving as the conductive agent 26, and a polyvinylidene fluoride powder serving as the binder 28 were mixed with respective percentages by mass of 92%, 5%, and 3%. Thus, a material mixture was obtained. To this material mixture, a calcium-magnesium double salt of myo-inositol hexaphosphate represented by the formula (4) and serving as the phosphoric acid ester compound 30 and a flame retardant was added in an amount of 3% by mass relative to the material mixture. This mixture was further mixed with a solution of N-methyl-2-pyrrolidone (NMP) to prepare slurry. This slurry was applied to both surfaces of the aluminum positive electrode current collector 20 having a thickness of 15 μm by the doctor blade method to thereby form positive electrode active material layers 22. After that, the resultant member was pressed with a press roller. Thus, a positive electrode was provided.

Production of Negative Electrode

Regarding a negative electrode active material, three materials that were natural graphite, artificial graphite, and artificial graphite the surface of which was covered with non-crystalline carbon were prepared and used as a mixture. The negative electrode was produced in the following manner. The negative electrode active material, a styrene-butadiene copolymer (SBR) serving as a binder, and carboxymethyl cellulose (CMC) serving as a thickener were mixed with respective percentages by mass of 98%, 1%, and 1%. This mixture was mixed with water to prepare slurry. This slurry was applied to both surfaces of a copper negative electrode current collector having a thickness of 10 μm by the doctor blade method to thereby form negative electrode active material layers. After that, the resultant member was pressed with a press roller so as to achieve a predetermined density. Thus, a negative electrode was provided.

Production of Electrolytic Solution

A non-aqueous solvent was prepared that contained ethylene carbonate (EC), ethyl methyl carbonate (EMC), and dimethyl carbonate (DMC) mixed in a volume ratio of 3:3:4. In this solvent, $LiPF_6$ serving as an electrolyte salt was dissolved at 1.0 mol/L. The resultant electrolytic solution was used for battery production.

Production of Cylindrical Type Non-Aqueous Electrolyte Secondary Battery

The positive electrode, the negative electrode, and the electrolytic solution produced above were used to produce a cylindrical type non-aqueous electrolyte secondary battery (hereafter, referred to as a cylindrical type battery) by the following procedures. The positive electrode 10 produced above was processed so as to have a short side length of 55 mm and a long side length of 600 mm. The negative electrode was processed so as to have a short side length of 57 mm and a long side length of 620 mm. The positive electrode 10 and the negative electrode were wound with the separator therebetween to thereby form a wound electrode assembly. Subsequently, the wound electrode assembly was contained within a battery package can having a cylindrical form such that insulators were disposed over and under the wound electrode assembly. The battery package can was made of steel and also functioned as a negative electrode terminal. The battery package can had a diameter of 18 mm and a height of 65 mm. A current collecting tab of the negative electrode was welded to an inner bottom portion of the battery package can. A current collecting tab of the positive electrode 10 was welded to a bottom plate portion of a current cut-off sealing member including a safety unit. The electrolytic solution was supplied through an opening into the battery package can. After that, the battery package can was sealed with the current cut-off sealing member including a safety valve and a current breaker. Thus, a cylindrical type battery was obtained.

Production of Coin Type Non-Aqueous Electrolyte Secondary Battery

The positive electrode and the electrolytic solution produced above were used to produce a coin type non-aqueous electrolyte secondary battery (hereafter, referred to as a coin type battery) by the following procedures. During production of the positive electrode, the slurry was applied to a single surface of the positive electrode current collector. A lithium metal foil was used as the negative electrode. The thus-produced positive electrode 10 was blanked so as to have a diameter of 17 mm. The negative electrode was blanked so as to have a diameter of 19 mm. Subsequently, the negative electrode was press-bonded to the inside of a bottom of a coin type battery case (constituted by a lid and the bottom) that was made of steel and had a diameter of 20 mm and a height of 5 mm. On this negative electrode, the separator, the positive electrode 10, a circular steel spacer, and a disk spring were placed in this order within the battery case. To the bottom of the battery case, the electrolytic solution was supplied. After that, the lid was placed on the bottom and the resultant battery case was sealed by compression. Thus, a coin type battery was obtained.

Example 2

A cylindrical type battery and a coin type battery used in Example 2 were produced as in Example 1 except that the amount of the calcium-magnesium double salt of myo-inositol hexaphosphate added as a flame retardant was changed from 3% by mass to 1% by mass.

Comparative Example 1

A cylindrical type battery and a coin type battery used in Comparative example 1 were produced as in Example 1 except that the calcium-magnesium double salt of myo-inositol hexaphosphate serving as a flame retardant was not added.

Comparative Example 2

A cylindrical type battery and a coin type battery used in Comparative example 2 were produced as in Example 1 except that the calcium-magnesium double salt of myo-inositol hexaphosphate serving as a flame retardant was changed to trimethyl phosphate (TMP) represented by a chemical formula of $(CH_3O)_3PO$ and an electrolytic solution was used that contained trimethyl phosphate dissolved in a ratio of 10% by mass relative to the total mass of the electrolytic solution. Since trimethyl phosphate completely dissolved in the electrolytic solution, the solubility is described in Table 1 as "arbitrary amount".

Differential Scanning Calorimetry

In order to evaluate the flame retardancy effect of the flame retardant, calorimetry was performed with a differential scanning calorimeter (DSC) in the presence of the positive electrode active material 24 and an electrolytic solution in a fully charged state. Specifically, each of the coin type batteries in Examples 1 and 2 and Comparative examples 1 and 2 was charged at a constant current of 0.3 mA at 25° C. until the battery voltage reached 4.3 V. After that, the coin type battery was disassembled. The positive electrode 10 was taken out of the battery case, and washed with a non-aqueous solvent to remove the electrolytic solution. Subsequently, from the positive electrode 10, 1 mg of the positive electrode active material layer was scraped and placed within a sealed pressure proof container together with 1 μL of the electrolytic solution to thereby provide a measurement sample. The measurement sample was analyzed with the DSC by heating from 25° C. to 550° C. at a temperature increase rate of 10° C./min and by measuring exothermic onset temperature, initial exothermic peak temperature, and amount of heat generated.

Table 1 summarizes results in terms of exothermic onset temperature, exothermic peak temperature, and amount of heat generated in Examples 1 and 2 and Comparative examples 1 and 2.

Figure 3:
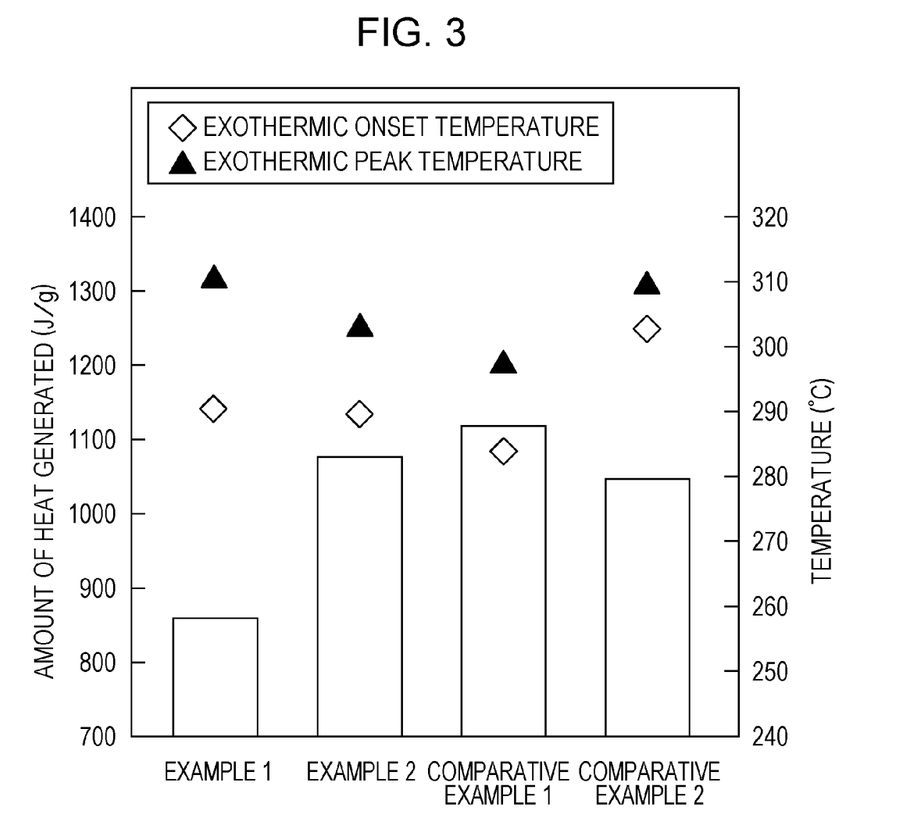
FIG. 3 illustrates results measured with DSC in terms of exothermic onset temperature, exothermic peak temperature, and amount of heat generated in Examples and Comparative examples.
Figure 4:
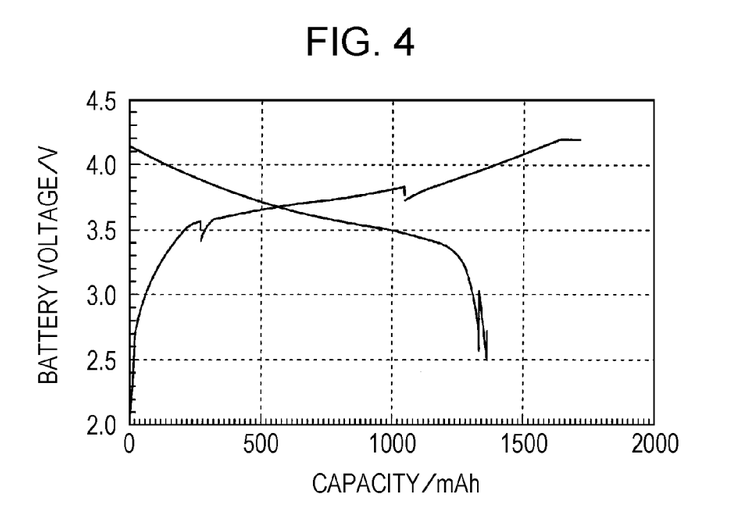
FIG. 4 illustrates initial charge-discharge curves in Example 1.
Figure 5:
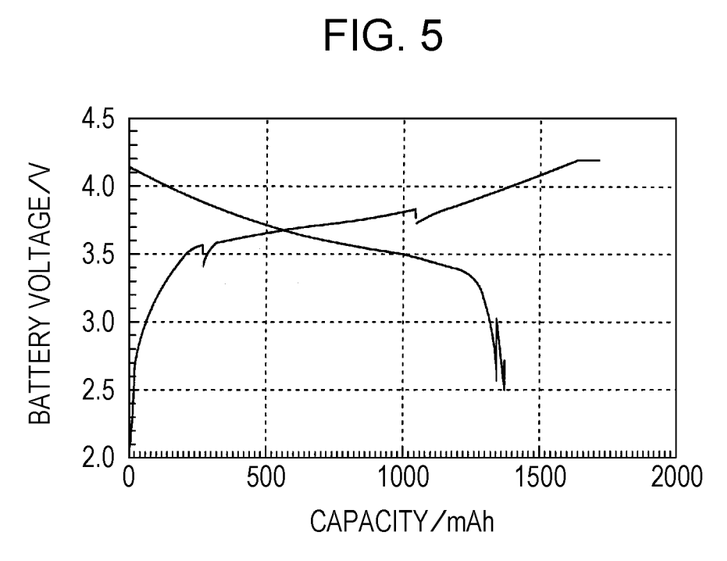
FIG. 5 illustrates initial charge-discharge curves in Example 2.
Figure 6:
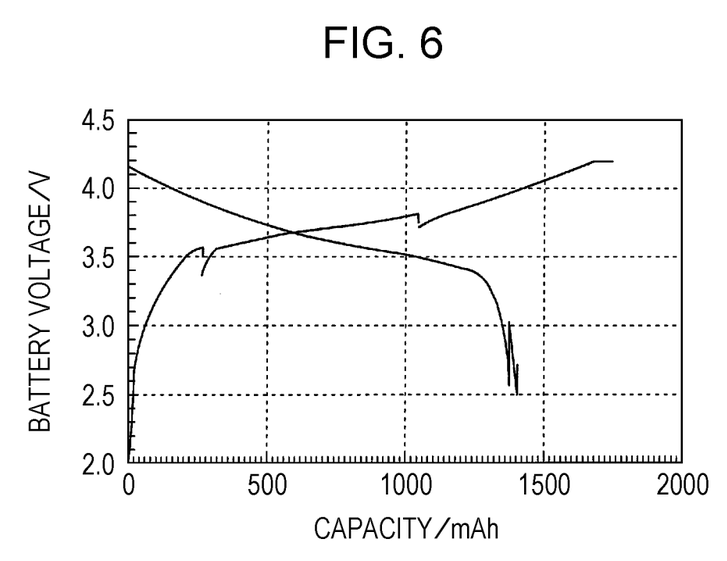
FIG. 6 illustrates initial charge-discharge curves in Comparative example 1.
Figure 7:
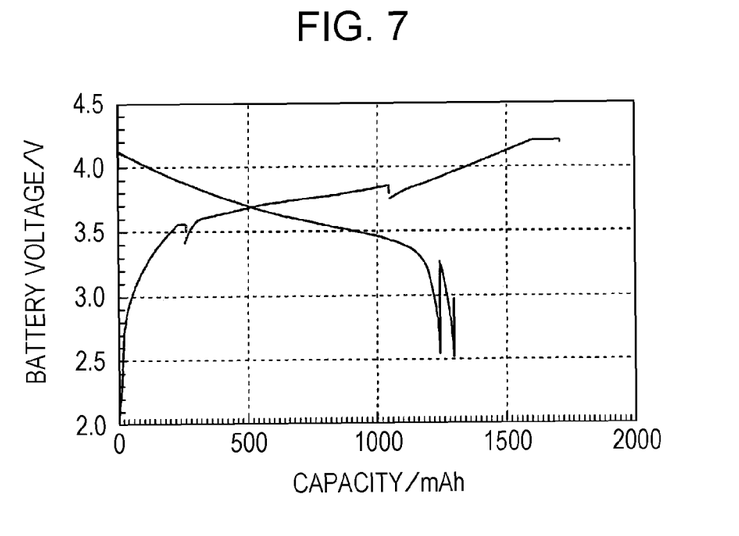
FIG. 7 illustrates initial charge-discharge curves in Comparative example 2.

FIG. 3 indicates that the exothermic onset temperature and the exothermic peak temperature are high and the amount of heat generated is small in Examples 1 and 2, compared with Comparative example 1. That is, as a result of the presence of the phosphoric acid ester compound 30 in the positive electrode 10, the exothermic onset temperature in the exothermic reaction between the positive electrode active material 24 and the electrolytic solution becomes high; and, in the exothermic reaction, the exothermic peak is shifted to a higher temperature and the amount of heat generated is reduced. Thus, when the phosphoric acid ester compound 30 is present within the positive electrode 10, the flame retardancy effect is further enhanced.

Compared with Comparative example 2, in Example 1, the exothermic onset temperature is low, the exothermic peak temperature is similar, and the amount of heat generated is small. Compared with Comparative example 2, in Example 2 in which the amount of addition of the phosphoric acid ester compound 30 is smaller than that in Example 1, the exothermic onset temperature is low, the exothermic peak temperature is low, and the amount of heat generated is slightly large. These results indicate that, when the phosphoric acid ester compound 30, which is a flame retardant difficult to dissolve in the electrolytic solution, is present in a small amount within the positive electrode 10, the amount of heat generated is reduced, which is similarly achieved by trimethyl phosphate that is the existing flame retardant soluble in the electrolytic solution. The amount of the phosphoric acid ester compound 30 added is, for example, 3% by mass. In Example 2 in which this amount is 1% by mass, sufficiently high flame retardancy is provided. Accordingly, even a very small amount of the phosphoric acid ester compound 30 probably exerts the effect of suppressing the exothermic reaction. From the viewpoint of suppressing the exothermic reaction, the amount of addition may be 0.1% by mass or more and 3% by mass or less.

Evaluation of Charge-Discharge Efficiency

Subsequently, in order to evaluate charge-discharge efficiency in the case of addition of the flame retardant, initial charging and discharging was evaluated. The evaluation was performed in the following manner. At 25° C., each of the

TABLE 1

| | Flame retardant | | | | | |
|---|---|---|---|---|---|---|
| | Name of compound | Amount of addition (% by mass) | Solubility (%) | Onset temperature (° C.) | Peak temperature (° C.) | Amount of heat generated (J/g) |
| Example 1 | Calcium-magnesium double salt of myo-inositol-1,2,3,4,5,6-hexaphosphate | 3 | <0.1 | 290 | 311 | 859 |
| Example 2 | | 1 | <0.1 | 288 | 303 | 1086 |
| Comparative example 1 | No addition | 0 | — | 284 | 298 | 1126 |
| Comparative example 2 | Trimethyl phosphate | 10*[1] | Arbitrary amount | 303 | 310 | 1041 |

*[1]Since trimethyl phosphate dissolves in the electrolytic solution, the value denotes amount of addition relative to the electrolytic solution.

Figure 2:
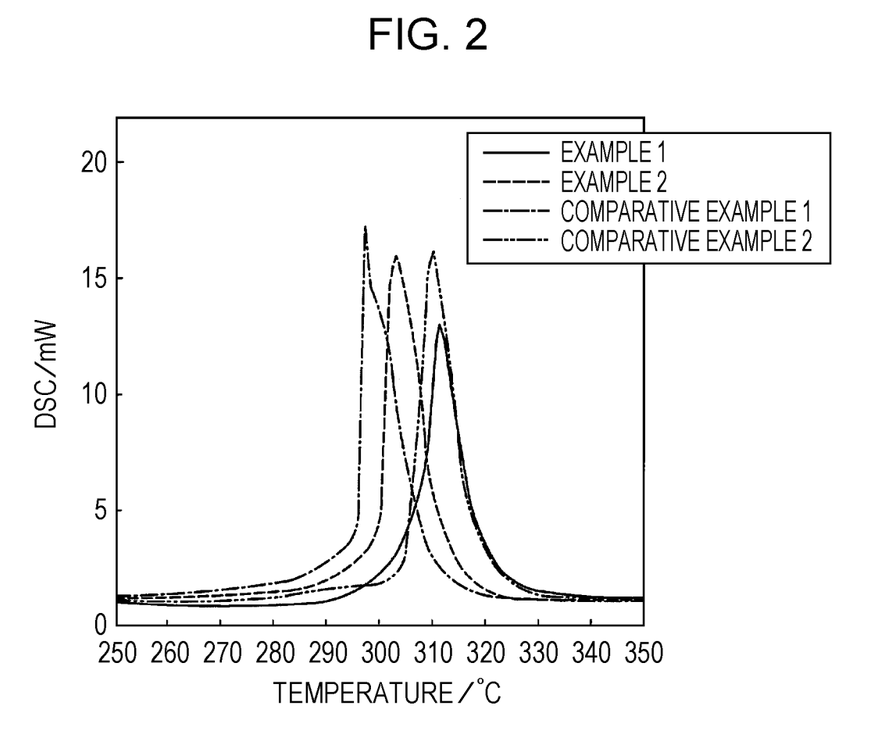
FIG. 2 illustrates exothermic behavior measured with DSC in Examples and Comparative examples.

FIG. 2 illustrates exothermic behavior measured with the DSC in Examples 1 and 2 and Comparative examples 1 and 2. In FIG. 2, the ordinate axis indicates heat flow (unit: mW) and the abscissa axis indicates temperature (unit: ° C.). FIG. 3 illustrates the summary of results measured with the DSC in terms of exothermic onset temperature, exothermic peak temperature, and amount of heat generated.

cylindrical type batteries in Examples 1 and 2 and Comparative examples 1 and 2 was charged at a constant current of 250 mA until the battery voltage reached 4.2 V, subsequently charged at the constant voltage until the charge current value reached 50 mA, and subsequently discharged at a constant current of 250 mA until the battery voltage reached 2.5 V. The discharge capacity was divided by the charge capacity and the resultant value was multiplied by 100 to thereby determine the charge-discharge efficiency (%).

Table 2 describes the charge-discharge efficiency in Examples 1 and 2 and Comparative examples 1 and 2. FIGS. 4 to 7 illustrate charge curves and discharge curves in Examples 1 and 2 and Comparative examples 1 and 2. In FIGS. 4 to 7, the ordinate axis indicates battery voltage (unit: V) and the abscissa axis indicates capacity (unit: mAh).

TABLE 2

| | Flame retardant | | | |
|---|---|---|---|---|
| | Name of compound | Amount of addition (% by mass) | Solubility (%) | Charge-discharge efficiency (%) |
| Example 1 | Calcium-magnesium double salt of myo-inositol-1,2,3,4,5,6-hexaphosphate | 3 | <0.1 | 79.01 |
| Example 2 | | 1 | <0.1 | 79.05 |
| Comparative example 1 | No addition | 0 | — | 79.11 |
| Comparative example 2 | Trimethyl phosphate | 10*[1] | Arbitrary amount | 76.17 |

*[1] Since trimethyl phosphate dissolves in the electrolytic solution, the value denotes amount of addition relative to the electrolytic solution.

From Table 2 and FIGS. 4 to 7, comparison between Comparative examples 1 and 2 indicates that the charge-discharge efficiency is lower in Comparative example 2. When a flame retardant soluble in the electrolytic solution such as trimethyl phosphate used in Comparative example 2 is added to the electrolytic solution, the flame retardant is widely distributed within the whole battery. When the flame retardant is thus widely distributed within the whole battery, the flame retardant decreases the ion conductivity of the electrolytic solution and also causes a side reaction with the negative electrode. This is probably the reason why the charge-discharge efficiency was low.

In contrast to Comparative example 2, in Examples 1 and 2, a decrease in the charge-discharge efficiency was suppressed and the charge-discharge efficiency was close to that in the case of not adding any flame retardant. The reason for this is probably as follows. The phosphoric acid ester compound 30 in Examples 1 and 2 is difficult to dissolve in the electrolytic solution and hence the phosphoric acid ester compound 30 added to the positive electrode active material layer 22 remained within the positive electrode 10. This suppressed a decrease in the ion conductivity of the electrolytic solution and a side reaction with the negative electrode, so that a considerable decrease in the charge-discharge efficiency was not caused and the charge-discharge efficiency close to that in the case of not adding any flame retardant was achieved. In addition to the charge-discharge efficiency, from FIGS. 4 to 6, the charge capacity and the discharge capacity in Examples 1 and 2 were close to those in Comparative example 1 in which no flame retardant was added.

As has been described, use of the phosphoric acid ester compound 30 provides the flame retardancy effect. In addition, since the phosphoric acid ester compound 30 is difficult to dissolve in the electrolytic solution, a decrease in the ion conductivity of the electrolytic solution and a side reaction with the negative electrode are suppressed and a high charge-discharge efficiency is achieved. Thus, the phosphoric acid ester compound 30 allows both a significant flame retardancy effect and a high charge-discharge efficiency.

Accordingly, a non-aqueous electrolyte secondary battery containing the phosphoric acid ester compound 30 has high battery performance, in particular, high flame retardancy and a high charge-discharge efficiency.

Example 3

Production of Positive Electrode

Regarding a positive electrode active material, a lithium-containing transition metal oxide represented by a compositional formula of $LiNi_{0.35}Co_{0.35}Mn_{0.3}O_2$ was used. A positive electrode was produced in the following manner. The positive electrode active material represented by the compositional formula of $LiNi_{0.35}Co_{0.35}Mn_{0.3}O_2$, acetylene black serving as a conductive agent, and a polyvinylidene fluoride powder serving as a binder were mixed with respective percentages by mass of 93.5%, 5%, and 1.5%. Thus, a material mixture was obtained. To this material mixture, a calcium-magnesium double salt of myo-inositol hexaphosphate represented by the formula (4) and serving as the phosphoric acid ester compound was added in an amount of 3% by mass relative to the material mixture. This mixture was further mixed with a solution of N-methyl-2-pyrrolidone (NMP) to prepare slurry. This slurry was applied to both surfaces of an aluminum positive electrode current collector having a thickness of 15 μm by the doctor blade method to thereby form positive electrode active material layers. After that, the resultant member was pressed with a press roller. Thus, a positive electrode was provided.

Production of Negative Electrode

Regarding a negative electrode active material, three materials that were natural graphite, artificial graphite, and artificial graphite the surface of which was covered with non-crystalline carbon were prepared and used as a mixture. The negative electrode was produced in the following manner. The negative electrode active material, a styrene-butadiene copolymer (SBR) serving as a binder, and carboxymethyl cellulose (CMC) serving as a thickener were mixed with respective percentages by mass of 98%, 1%, and 1%. This mixture was mixed with water to prepare slurry. This slurry was applied to both surfaces of a copper negative electrode current collector having a thickness of 10 μm by the doctor blade method to thereby form negative electrode active material layers. After that, the resultant member was pressed with a press roller so as to achieve a predetermined density. Thus, a negative electrode was provided.

Production of Electrolytic Solution Z1

A non-aqueous solvent was prepared that contained FEC, ethylene carbonate (EC), ethyl methyl carbonate (EMC), and dimethyl carbonate (DMC) mixed in a mass ratio of 5:20:35:40. In this solvent, $LiPF_6$ serving as an electrolyte salt was dissolved at 1.0 mol/L. Thus, electrolytic solution Z1 was provided.

Production of Cylindrical Type Non-Aqueous Electrolyte Secondary Battery

The positive electrode, the negative electrode, and the electrolytic solution Z1 produced above were used to produce a cylindrical type non-aqueous electrolyte secondary battery (hereafter, referred to as a cylindrical type battery) by the following procedures. The positive electrode produced above was processed so as to have a short side length of 55 mm and a long side length of 450 mm. The negative electrode was processed so as to have a short side length of 57 mm and a long side length of 550 mm. The positive electrode and the negative electrode were wound with a PP/PE/PP trilayer separator therebetween to thereby form a wound electrode assembly. Subsequently, the wound electrode assembly was contained within a battery package can having a cylindrical form such that insulators were disposed over and under the wound electrode assembly. The battery package can was made of steel and also functioned as a negative electrode terminal. The battery package can had a diameter of 18 mm and a height of 65 mm. A current collecting tab of the negative electrode was welded to an inner bottom portion of the battery package can. A current collecting tab of the positive electrode was welded to a bottom plate portion of a current cut-off sealing member including a safety unit. The electrolytic solution Z1 was supplied through an opening into the battery package can. After that, the battery package can was sealed with the current cut-off sealing member including a safety valve and a current breaker. Thus, a cylindrical type battery was obtained.

Example 4

A cylindrical type battery was produced as in Example 3 except that the amount of the phosphoric acid ester compound added was changed from 3% by mass to 1% by mass.

Example 5

A coin type non-aqueous electrolyte secondary battery was produced by the following procedures.
Production of Electrolytic Solution Z2
A non-aqueous solvent was prepared that contained FEC, ethylene carbonate (EC), ethyl methyl carbonate (EMC), and dimethyl carbonate (DMC) mixed in a mass ratio of 3:27:30:40. In this solvent, $LiPF_6$ serving as an electrolyte salt was dissolved at 1.0 mol/L. Thus, electrolytic solution Z2 was provided.
Production of Coin Type Non-Aqueous Electrolyte Secondary Battery
The positive electrode and the negative electrode produced in Example 3 and the electrolytic solution Z2 were used to produce a coin type non-aqueous electrolyte secondary battery (hereafter, referred to as a coin type battery) by the following procedures. During production of the positive electrode, the slurry was applied to a single surface of the positive electrode current collector. During production of the negative electrode, the slurry was applied to a single surface of the negative electrode current collector. The thus-produced positive electrode was blanked so as to have a diameter of 17 mm. The negative electrode was blanked so as to have a diameter of 19 mm. Subsequently, the negative electrode was press-bonded to the inside of a bottom of a coin type battery case (constituted by a lid and the bottom) that was made of steel and had a diameter of 20 mm and a height of 5 mm. On this negative electrode, the separator, the positive electrode, a circular steel spacer, and a disk spring were placed in this order within the battery case. To the bottom of the battery case, the electrolytic solution Z2 was supplied. After that, the lid was placed on the bottom and the resultant battery case was sealed by compression. Thus, a coin type battery was obtained.

Comparative Example 3

A cylindrical type battery was produced as in Example 3 except that the phosphoric acid ester compound was not added to the positive electrode material mixture and, in the "Production of electrolytic solution Z1", the entire amount of FEC was replaced by EC.

Comparative Example 4

A cylindrical type battery was produced as in Example 3 except that the phosphoric acid ester compound was not added to the positive electrode material mixture.

Comparative Example 5

A coin type battery was produced as in Example 5 except that the phosphoric acid ester compound was not added to the positive electrode material mixture and, in the "Production of electrolytic solution Z2", the entire amount of FEC was replaced by EC.

Comparative Example 6

A coin type battery was produced as in Example 5 except that the phosphoric acid ester compound was not added to the positive electrode material mixture.

Differential Scanning Calorimetry

In order to evaluate the effect of suppressing the exothermic reaction between the electrolytic solution and the positive electrode active material, the effect being provided by the phosphoric acid ester compound, calorimetry was performed with a differential scanning calorimeter (DSC) in the presence of the positive electrode active material and the electrolytic solution in a fully charged state. Specifically, each of the coin type batteries in Example and Comparative examples was charged at a constant current of 0.3 mA at 25° C. until the battery voltage reached 4.4 V. After that, the coin type battery was disassembled. The positive electrode was taken out of the battery case, and washed with a non-aqueous solvent to remove the electrolytic solution. Subsequently, from the positive electrode, 1 mg of the positive electrode active material layer was scraped and placed within a sealed pressure proof container together with 1 µL of the electrolytic solution to thereby provide a measurement sample. The measurement sample was analyzed with the DSC by heating from 25° C. to 550° C. at a temperature increase rate of 10° C./min and by measuring exothermic onset temperature, initial exothermic peak temperature, and amount of heat generated.

Evaluation of Initial Discharge Capacity

At 25° C., each of the cylindrical type batteries in Examples and Comparative examples was charged at a constant current of 1400 mA until the battery voltage reached 4.35 V, subsequently charged at the constant voltage until the charge current value reached 70 mA, and subsequently discharged at a constant current of 1400 mA until the battery voltage reached 2.5 V. At this time, the discharge capacity was determined.

Evaluation of Cycle Characteristic (Capacity Retention Ratio)

The above-described charging and discharging defined as a single cycle was repeatedly performed at 45° C. The discharge capacity during the 500th cycle was divided by the discharge capacity during the 1st cycle and the resultant value was multiplied by 100 to thereby determine the capacity retention ratio.

Table 3 describes measurement results in terms of exothermic onset temperature, exothermic peak temperature, amount of heat generated, initial discharge capacity, and capacity retention ratio for non-aqueous electrolyte secondary batteries in Examples and Comparative examples.

TABLE 3

| | Exothermic onset temperature (° C.) | Exothermic peak temperature (° C.) | Amount of heat generated (J/g) | Initial discharge capacity (mAh) | Capacity retention ratio (%) |
|---|---|---|---|---|---|
| Example 3 | — | — | — | 1640 | 89 |
| Example 4 | — | — | — | 1625 | 88 |
| Example 5 | 228 | 298 | 655 | — | — |
| Comparative example 3 | — | — | — | 1640 | 83 |
| Comparative example 4 | — | — | — | 1595 | 88 |
| Comparative example 5 | 219 | 285 | 858 | — | — |
| Comparative example 6 | 216 | 282 | 926 | — | — |

Table 3 indicates the following. The cylindrical type battery in Comparative example 3 in which FEC is not contained does not have a good cycle characteristic (capacity retention ratio). The cylindrical type battery in Comparative example 4 in which the phosphoric acid ester compound is not contained has a low initial discharge capacity. In contrast, in the cylindrical type batteries of Examples 3 and 4 in which FEC and a calcium-magnesium double salt of myo-inositol hexaphosphate that is a phosphoric acid ester compound are contained, the cycle characteristic is good and the initial discharge capacity is similar to that of the cylindrical type battery of Comparative example 3 in which FEC is not contained. That is, in the cylindrical type batteries of Examples 3 and 4, a decrease in the initial discharge capacity (Comparative example 4) caused by the use of FEC is suppressed.

In Example 5, compared with Comparative examples 5 and 6, the exothermic onset temperature in the reaction (side reaction) between the positive electrode active material and the electrolytic solution becomes high; and, in the exothermic reaction, the exothermic peak is shifted to a higher temperature and the amount of heat generated is reduced. In Comparative example 6, the amount of heat generated is large due to the use of FEC. In contrast, in Example 5, the amount of heat generated is smaller than that in Comparative example 5 in which FEC is not used. One of the reasons why an increase in the amount of heat generated is caused by use of FEC is probably that the flash point of FEC is lower than that of EC and the like. In spite of that, in Example 5, such an increase in the amount of heat generated is suppressed probably because the phosphoric acid ester compound contained within the positive electrode active material layers provides the flame retardancy effect.

As described above, in non-aqueous electrolyte secondary batteries in Examples, while a good cycle characteristic is achieved due to the effect of FEC, disadvantages due to the use of FEC (decrease in initial discharge capacity and increase in amount of heat generated in side reaction) can be suppressed.

Second Embodiment

Hereinafter, a second embodiment according to the present disclosure will be described in detail. Specifically, a positive electrode member of a non-aqueous electrolyte secondary battery will be described in detail. In the second embodiment, the flame retardant in the first embodiment was disposed at a high concentration in a portion close to the positive electrode current collector.

The configuration other than the positive electrode is the same as in the first embodiment and hence is not described.

Positive Electrode

Figure 8:
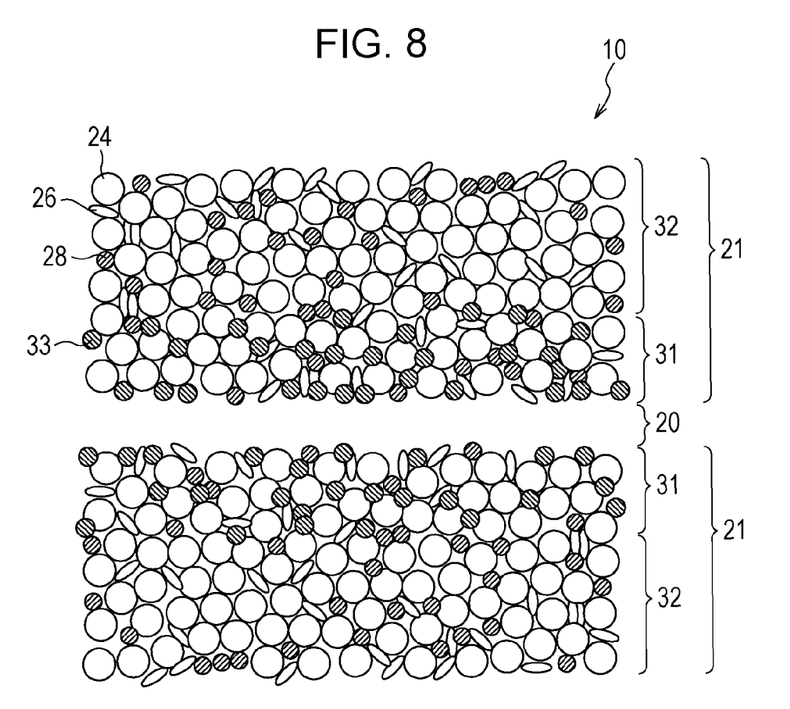
FIG. 8 is a fragmentary sectional view of a positive electrode for a non-aqueous electrolyte secondary battery according to a second embodiment of the present disclosure.

FIG. 8 is a fragmentary sectional view of a positive electrode 10. The positive electrode 10 includes a positive electrode current collector 20 formed of a metal foil or the like and positive electrode active material layers 21 formed on the positive electrode current collector 20. The positive electrode current collector 20 is, for example, a foil of a metal that is stable in a potential range of the positive electrode or a film having a surface layer formed of a metal that is stable in a potential range of the positive electrode. Such a metal that is stable in a potential range of the positive electrode is, for example, aluminum. Each positive electrode active material layer 21 includes a first material mixture layer 31 containing a flame retardant and formed on the positive electrode current collector 20, and a second material mixture layer 32 formed on the first material mixture layer 31.

The first material mixture layer 31 contains, in addition to a positive electrode active material 24, a conductive agent 26, a binder 28, a flame retardant 33, and the like. These substances are mixed in an appropriate solvent, applied to the positive electrode current collector 20, subsequently dried and rolled, so that the first material mixture layer 31 is formed.

The second material mixture layer 32 contains, in addition to a positive electrode active material 24, a conductive agent 26, a binder 28, and the like. These substances are mixed in an appropriate solvent, applied to the positive electrode current collector 20, subsequently dried and rolled, so that the second material mixture layer 32 is formed. The positive electrode active material 24, the conductive agent 26, and the binder 28 in the second material mixture layer 32 may be the same as those in the first material mixture layer 31.

The positive electrode active material 24, the conductive agent 26, and the binder 28 may be the same as those in the first embodiment.

The flame retardant 33 is a powder or particles present within the first material mixture layer 31 and difficult to dissolve in the non-aqueous electrolytic solution. The flame retardant 33 has a function of suppressing the chain reaction between the positive electrode active material and the non-aqueous electrolytic solution, the chain reaction being caused by Joule's heat generated in the positive electrode current collector 20. The flame retardant 33 is, for example, disposed together with the positive electrode active material 24. That is, the flame retardant 33 is, for example, fixed so as to be close to the positive electrode active material 24 and remains within the positive electrode active material layer 21. The flame retardant 33 may be the phosphoric acid ester compound used in the first embodiment.

Such a configuration allows suppression of, among exothermic reactions, in particular, an exothermic reaction caused by external damage such as nail penetration and allows a high power battery.

Figure 9:
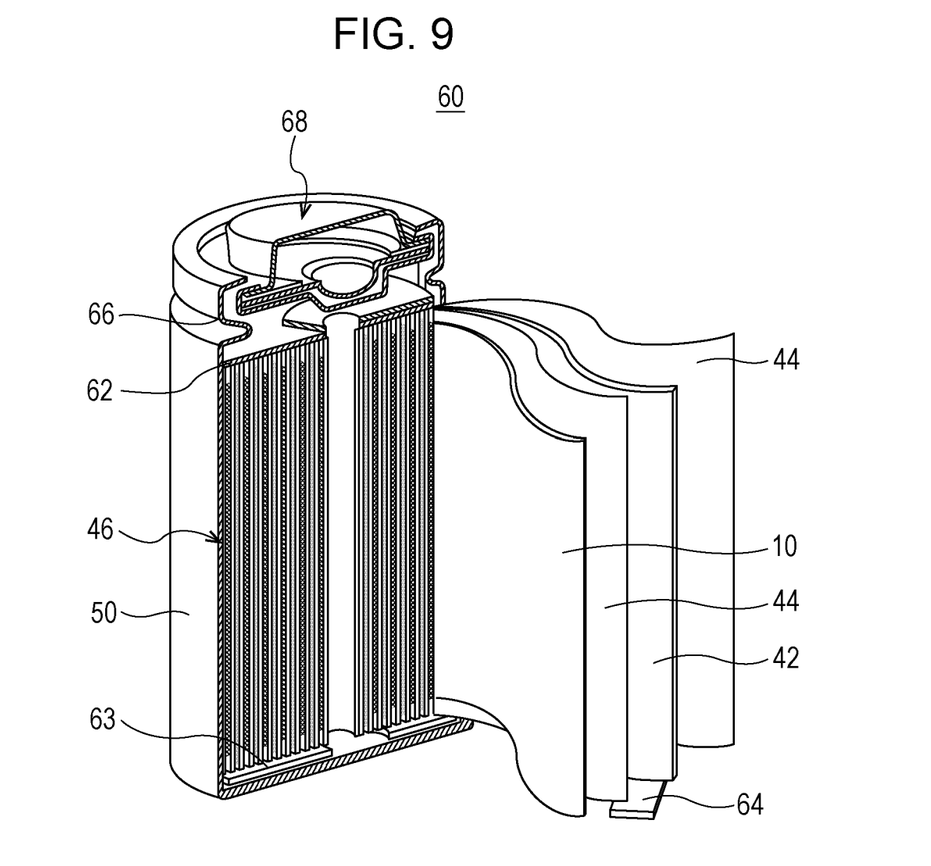
FIG. 9 is a perspective view of a non-aqueous electrolyte secondary battery according to a second embodiment of the present disclosure, the perspective view also illustrating a longitudinal section of the battery.

FIG. 9 is a perspective view of a non-aqueous electrolyte secondary battery according to an embodiment of the present disclosure, the perspective view also illustrating a longitudinal section of the battery. FIG. 9 illustrates a wound electrode assembly 46 contained within a battery package can 50, the wound electrode assembly 46 being obtained by winding the positive electrode 10 and a negative electrode 42 with a separator 44 therebetween. In FIG. 9, for example, a sharply pointed nail (not shown) is penetrated through the battery package can 50, in a direction perpendicular to the side surface of the battery package can 50. This nail penetrates the wound electrode assembly 46 in which the negative electrode 42, the separator 44, and the positive electrode 10 are stacked in this order, so that an internal short circuit occurs. Such an internal short circuit includes a short circuit between the positive electrode current collector 20 and the negative electrode 42, and a short circuit between a surface layer portion of the positive electrode active material layer 21 and the negative electrode 42. Of these, the former short circuit generates a larger amount of heat. This is probably because Joule's heat near the positive electrode current collector 20 is high and this Joule's heat induces the exothermic reaction between the positive electrode active material 24 and the non-aqueous electrolytic solution.

Accordingly, the inventors of the present disclosure considered that, by disposing the flame retardant 33 so as to be close to the positive electrode current collector 20, the reaction between the positive electrode 10 and the non-aqueous electrolytic solution is suppressed. In order to dispose the flame retardant 33 so as to be close to the positive electrode current collector 20, the inventors considered that the first material mixture layer 31 containing the flame retardant 33 is formed on the positive electrode current collector 20. When the flame retardant 33 is present in the surface layer portion of the positive electrode active material layer 21, the flame retardant 33 probably inhibits ionic conduction during charging and discharging and input/output characteristics are degraded. Accordingly, the inventors considered that the second material mixture layer 32 that does not substantially contain the flame retardant 33 is disposed on the first material mixture layer 31, so that the flame retardant 33 is not substantially present in the surface layer portion of the positive electrode active material layer 21 and, as a result, degradation of input/output characteristics is suppressed. In this embodiment, the positive electrode active material layer 21 has a bilayer configuration including the first material mixture layer 31 and the second material mixture layer 32. Alternatively, the positive electrode active material layer 21 may have a configuration of three or more layers as long as the concentration of the flame retardant 33 contained in the positive electrode active material layer 21 is higher in a portion close to the positive electrode current collector 20 than in the surface layer portion of the positive electrode active material layer 21.

As in the first embodiment, the optimal amount of the flame retardant added relative to the entirety of the positive electrode active material layer can be calculated on the basis of the volumetric energy density of the positive electrode. The ratio of this amount relative to the total mass of the positive electrode active material layer 21 is, for example, 0.1% by mass or more and 5% by mass or less, for example, 0.1% by mass or more and 3% by mass or less.

In order to sufficiently provide the effect of the flame retardant 33, the content of the flame retardant 33 relative to the total mass of the positive electrode active material 24 contained in the first material mixture layer 31 is, for example, 0.5% by mass or more and 20% by mass or less. When the content is less than the lower limit of 0.5% by mass, there is a possibility that the effect of the flame retardant 33 is not sufficiently provided, which is not preferred. Regarding the upper limit of the content, the larger the amount of the flame retardant 33 added, the smaller the total mass of the positive electrode active material 24 becomes. Accordingly, the content of the flame retardant 33 is, for example, such a value that a desired battery capacity can be ensured. Regarding the thickness of the first material mixture layer 31, a value obtained by dividing the thickness of the first material mixture layer 31 by the total of the thickness of the first material mixture layer 31 and the thickness of the second material mixture layer 32 is, for example, less than 0.5.

In order to suppress degradation of input/output characteristics, the second material mixture layer 32, for example, does not contain the flame retardant 33. Regarding the index of not containing the flame retardant 33, for example, the content of the flame retardant 33 relative to the total mass of the positive electrode active material 24 contained in the second material mixture layer 32 is, for example, 1% by mass or less, for example, 0.5% by mass or less, for example, 0% by mass.

Although the method of producing the positive electrode 10 is described below, the second material mixture layer 32 is formed on the first material mixture layer 31 by application and subsequently rolling is performed. Accordingly, at the boundary between the first material mixture layer 31 and the second material mixture layer 32, there is probably a region having a thickness of, for example, about 10 μm where the first material mixture layer 31 is mixed with the second material mixture layer 32, depending on various conditions of, for example, the particle size and dispersibility of the positive electrode active material 24, the conductive agent 26, the binder 28, and the flame retardant 33. Accordingly, in a section of the positive electrode 10 as in FIG. 8, in order to differentiate between the first material mixture layer 31 and the second material mixture layer 32, the mixing region therebetween needs to be considered.

EXAMPLES

Example 6

Production of Positive Electrode

Regarding the positive electrode active material 24, a lithium-containing transition metal oxide represented by a compositional formula of $LiNi_{0.5}Co_{0.2}Mn_{0.3}O_2$ was used. The positive electrode 10 was produced in the following manner. The positive electrode active material 24 represented by the compositional formula of $LiNi_{0.5}Co_{0.2}Mn_{0.3}O_2$, acetylene black serving as the conductive agent 26, a polyvinylidene fluoride powder serving as the binder 28 were mixed with respective percentages by mass of 92%, 5%, and 3%. Thus, a material mixture was obtained. To this material mixture, as the flame retardant 33, a calcium-magnesium double salt of myo-inositol hexaphosphate that was used as a phosphoric acid ester compound in Example 1 was added in an amount of 10% by mass relative to the material mixture. This mixture was further mixed with a solution of N-methyl-2-pyrrolidone (NMP) to prepare Positive electrode slurry 1. This Positive electrode slurry 1 was applied to both surfaces of an aluminum positive electrode current collector 20 having a thickness of 15 μm by the doctor blade method, and subsequently dried. Thus, on the surfaces, first material mixture layers 31 each having a thickness of about 20 μm and containing the flame retardant 33 were formed.

Subsequently, the positive electrode active material 24 represented by $LiNi_{0.5}Co_{0.2}Mn_{0.3}O_2$, acetylene black serving as the conductive agent 26, a polyvinylidene fluoride powder serving as the binder 28 were mixed with respective percentages by mass of 92%, 5%, and 3%. This mixture was further mixed with a solution of N-methyl-2-pyrrolidone (NMP) to prepare Positive electrode slurry 2. This Positive electrode slurry 2 was applied by the doctor blade method to the first material mixture layers 31 with a coating weight that was about 2.5 times the coating weight of the first material mixture layers 31, and subsequently dried. The resultant member in which the positive electrode current collector 20, the first material mixture layer 31, and the second material mixture layer 32 were stacked in this order was pressed to thereby provide the positive electrode 10 in which the first material mixture layer 31 had a thickness of about 20 μm and the second material mixture layer 32 had a thickness of about 55 μm.

Production of Negative Electrode

Regarding a negative electrode active material, three materials that were natural graphite, artificial graphite, and artificial graphite the surface of which was covered with non-crystalline carbon were prepared and used as a mixture. The negative electrode 42 was produced in the following manner. The negative electrode active material, a styrene-butadiene copolymer (SBR) serving as a binder, and carboxymethyl cellulose (CMC) serving as a thickener were mixed with respective percentages by mass of 98%, 1%, and 1%. This mixture was mixed with water to prepare slurry. This slurry was applied to both surfaces of a copper negative electrode current collector having a thickness of 10 μm by the doctor blade method to thereby form negative electrode active material layers. After that, the resultant member was pressed with a press roller so as to achieve a predetermined density. Thus, the negative electrode 42 was provided.

Production of Non-Aqueous Electrolyte

A non-aqueous solvent was prepared that contained ethylene carbonate (EC), ethyl methyl carbonate (EMC), and dimethyl carbonate (DMC) mixed in a volume ratio of 3:3:4. In this solvent, $LiPF_6$ serving as an electrolyte salt was dissolved at 1.0 mol/L. The resultant non-aqueous electrolytic solution was used for battery production.

Production of Cylindrical Type Non-Aqueous Electrolyte Secondary Battery

The positive electrode, the negative electrode, and the non-aqueous electrolytic solution produced above were used to produce a cylindrical type non-aqueous electrolyte secondary battery (hereafter, referred to as a cylindrical type battery) by the following procedures. The separator was a microporous film formed of polypropylene. FIG. 9 is a perspective view of a cylindrical type battery 60, the perspective view also illustrating a longitudinal section of the battery 60. The positive electrode 10 produced above was processed so as to have a short side length of 55 mm and a long side length of 450 mm. A current collecting tab 66 formed of aluminum was formed in a central portion (in the long side direction) of the positive electrode 10. The negative electrode 42 was processed so as to have a short side length of 57 mm and a long side length of 550 mm. Current collecting tabs 64 formed of copper were formed at both ends (in the long side direction) of the negative electrode 42.

The positive electrode 10 and the negative electrode 42 were wound with a PP/PE/PP trilayer separator 44 therebetween to thereby form a wound electrode assembly 46. Subsequently, the wound electrode assembly 46 was contained within a battery package can 50 having a cylindrical form such that insulators 62 and 63 were disposed over and under the wound electrode assembly 46. The battery package can 50 was made of steel and also functioned as a negative electrode terminal. The battery package can 50 had a diameter of 18 mm and a height of 65 mm. The two current collecting tabs 64 of the negative electrode 42 were welded to an inner bottom portion of the battery package can 50. The current collecting tab 66 of the positive electrode 10 was welded to a bottom plate portion of a current cut-off sealing member 68 including a safety valve and a current breaker.

The non-aqueous electrolytic solution was supplied through an opening into the battery package can 50. After that, the battery package can 50 was sealed with the current cut-off sealing member 68. Thus, the cylindrical type battery 60 was obtained. The rated capacity of the cylindrical type battery 60 was set to 1200 mAh.

Comparative Example 7

A cylindrical type battery in Comparative example 7 was produced as in Example 6 except that Positive electrode slurry 2 prepared in Example 6 was applied by the doctor blade method to both surfaces of the positive electrode current collector 20 and subsequently dried, so that only the second material mixture layers 32 each having a thickness of about 80 μm were formed on both surfaces of the positive electrode current collector 20.

Evaluation of Discharge Capacity

A charge-discharge test was performed at an ambient temperature of 25° C. for the purpose of evaluating Example 6 and Comparative example 7 in terms of discharge capacity. The test was performed in the following manner. Each of the cylindrical type batteries in Example 6 and Comparative example 7 was charged at a constant current of 1 C (1200 mA) until the battery voltage reached 4.2 V, then continuously charged at the constant voltage until the current value reached 0.05 C (60 mA), subsequently discharged at a constant current of 1 C (1200 mA) until the battery voltage reached 2.5 V, and further discharged at a constant current of ⅓ C (400 mA) until the battery voltage reached 2.5 V. Table 4 describes the results of the sum of battery capacities at 1 C and ⅓ C.

Evaluation of Output Characteristic

A charge-discharge test was performed at an ambient temperature of 25° C. for the purpose of evaluating Example 6 and Comparative example 7 in terms of output characteristic. Each of the cylindrical type batteries in Example 6 and Comparative example 7 was charged at a constant current of 1 C (1200 mA) until the battery voltage reached 4.2 V, then continuously charged at the constant voltage until the current value reached 0.05 C (60 mA), and subsequently discharged at a constant current of 1 C (1200 mA) for 50% of the discharge capacity of the cylindrical type battery determined in the "Evaluation of discharge capacity". Subsequently, the battery was discharged at constant currents of 1, 5, 10, 15, 20, 25, 30, 35, and 40 A for 10 seconds and, for respective discharge currents, battery voltages after the lapse of 10 seconds were measured. In this measurement, a current value at which the cell voltage became 2.7 V was read. In this way, the output characteristic was evaluated. Table 4 describes the results.

TABLE 4

|  | Amount of addition (% by mass) | Thickness of first material mixture layer (μm) | Thickness of second material mixture layer (μm) | Discharge capacity (mAh) | Output current (A) |
|---|---|---|---|---|---|
| Example 6 | 10 | 20 | 55 | 1205 | 35 |
| Comparative example 7 | None | — | 80 | 1215 | 36 |

As described in Table 4, in Example 6 in which the flame retardant 33 is present at a high concentration in a portion close to the positive electrode current collector 20, good characteristics were achieved. Specifically, the discharge capacity and the output current in Example 6 were similar to those in Comparative example 7 in which the flame retardant is not added.

Nail Penetration Test

For the purpose of evaluating the reaction suppression effect provided by formation of the first material mixture layer 31 on the positive electrode current collector 20, the cylindrical type batteries in Example 6 and Comparative example 7 in a fully charged state were subjected to a nail penetration test. The test was performed in the following manner. At an ambient temperature of 25° C., each of the cylindrical type batteries in Example 6 and Comparative example 7 was charged at a constant current of 1.0 C (1200 mA) until the battery voltage reached 4.2 V, and then continuously charged at the constant voltage until the current value reached 0.05 C (60 mA). Subsequently, in an environment where the battery temperature became 65° C., the sharply pointed tip of a wire nail having a diameter of 3 mm was brought into contact with a central portion of the side surface of each of the cylindrical type batteries in Example 6 and Comparative example 7; the wire nail was made to penetrate the cylindrical type battery at a rate of 80 mm/sec in the diameter direction of the battery; and the penetration by the wire nail was stopped at the time when the wire nail completely penetrated through the cylindrical type battery. Subsequently, in order to evaluate the battery temperature behavior after the penetration, the battery temperature was measured with a thermocouple disposed in contact with the battery surface. Such battery temperatures used for evaluation were battery temperatures after lapses of 5 and 10 seconds from the penetration and the maximum temperature. The results of the battery temperatures are described in Table 5.

TABLE 5

| | Battery temperature | | |
|---|---|---|---|
| | After lapse of 5 seconds (° C.) | After lapse of 10 seconds (° C.) | Maximum temperature (° C.) |
| Example 6 | 225 | 231 | 237 |
| Comparative example 7 | 296 | 364 | 372 |

From Table 5, compared with Comparative example 7, in Example 6, the battery temperatures after lapses of 5 and 10 seconds are low and the maximum temperature is low. The reason for this is probably as follows. In Example 6, the flame retardant 33 was present in a portion close to the positive electrode current collector 20. As a result, without causing a decrease in the discharge capacity or the output current, the reaction between the positive electrode active material and the non-aqueous electrolytic solution was suppressed, the reaction being induced by heat generated by a short circuit between the positive electrode current collector and the negative electrode active material. Thus, heat generation of the battery was suppressed.

As has been described, in a positive electrode for a non-aqueous electrolyte secondary battery in which the concentration of a flame retardant contained in the positive electrode active material layer is higher in a portion close to the positive electrode current collector than in the surface layer portion of the positive electrode active material layer and in a non-aqueous electrolyte secondary battery including the positive electrode for a non-aqueous electrolyte secondary battery, the reaction between the positive electrode active material and the non-aqueous electrolytic solution is suppressed, the reaction being induced by heat generated by an internal short circuit caused by nail penetration or the like, and input/output characteristics are good.

What is claimed is:

1. A non-aqueous electrolyte secondary battery comprising:
    an electrode assembly having
        a positive electrode including a positive electrode active material layer,
        a negative electrode, and
        a separator disposed between the positive electrode and the negative electrode; and
    a non-aqueous electrolyte,
    wherein at least one of the positive electrode and the separator contains a phosphoric acid ester compound containing at least one metal element and represented by a general formula (1)

where X and Y each represent a metal element, a hydrogen atom, or an organic group; at least one of X and Y represents a metal element; when the metal element is divalent, X and Y together represent a single metal element; and n represents an integer of 2 or more and 10 or less.

2. The non-aqueous electrolyte secondary battery according to claim 1, wherein the phosphoric acid ester compound is contained within the positive electrode active material layer.

3. The non-aqueous electrolyte secondary battery according to claim 1, wherein the phosphoric acid ester compound contains, as the metal element, at least one of Mg and Ca.

4. The non-aqueous electrolyte secondary battery according to claim 1, wherein the phosphoric acid ester compound is a cyclic phosphoric acid ester.

5. The non-aqueous electrolyte secondary battery according to claim 1, wherein the phosphoric acid ester compound is a metal salt of inositol-1,2,3,4,5,6-hexaphosphate having at least one metal element and represented by a general formula (2)

where $X_1$ to $X_6$ and $Y_1$ to $Y_6$ each represent a metal element, a hydrogen atom, or an organic group; at least one of $X_1$ to $X_6$ and $Y_1$ to $Y_6$ represents a metal element; when the metal element is divalent, $X_m$ and $Y_m$ together represent a single metal element where m represents an integer of 1 to 6.

6. The non-aqueous electrolyte secondary battery according to claim 1, wherein the phosphoric acid ester compound is a metal salt of myo-inositol-1,2,3,4,5,6-hexaphosphate having at least one metal element and represented by a general formula (3)

(3)

where $X_1$ to $X_6$ and $Y_1$ to $Y_6$ each represent a metal element, a hydrogen atom, or an organic group; at least one of $X_1$ to $X_6$ and $Y_1$ to $Y_6$ represents a metal element; when the metal element is divalent, $X_m$ and $Y_m$ together represent a single metal element where m represents an integer of 1 to 6.

7. The non-aqueous electrolyte secondary battery according to claim 1, wherein the phosphoric acid ester compound is a metal salt of myo-inositol hexaphosphate represented by a compositional formula of $C_6H_6Ca_mMg_{6-m}O_{24}P_6$ where m satisfies $0 \leq m \leq 6$.

8. The non-aqueous electrolyte secondary battery according to claim 1, wherein a content of the phosphoric acid ester compound relative to the positive electrode active material layer is 0.1% by mass or more and 5% by mass or less.

9. The non-aqueous electrolyte secondary battery according to claim 1, wherein the non-aqueous electrolyte contains fluorinated ethylene carbonate.

10. The non-aqueous electrolyte secondary battery according to claim 1, wherein the positive electrode has
the positive electrode active material layer that includes
a first material mixture layer containing a positive electrode active material and the phosphoric acid ester compound and
a second material mixture layer containing a positive electrode active material, and a positive electrode current collector,
wherein the positive electrode current collector, the first material mixture layer, and the second material mixture layer are stacked in this order, and a concentration of the phosphoric acid ester compound contained within the positive electrode active material layer is higher in a portion close to the positive electrode current collector than in a surface layer portion of the positive electrode active material layer.

\* \* \* \* \*